United States Patent [19]

Payton

[11] Patent Number: 4,494,240
[45] Date of Patent: Jan. 15, 1985

[54] MODEM END OF MESSAGE DETECTOR

[75] Inventor: John L. Payton, Dedham, Mass.

[73] Assignee: Codex Corporation, Mansfield, Mass.

[21] Appl. No.: 455,306

[22] Filed: Jan. 3, 1983

[51] Int. Cl.³ .............................................. H03K 5/20
[52] U.S. Cl. ...................................... 375/75; 375/113
[58] Field of Search ............... 375/75, 94, 104, 95, 375/106, 113, 114, 121, 116; 370/100, 104, 105, 106; 371/42, 46; 455/218, 223

[56] References Cited

U.S. PATENT DOCUMENTS

| | | | |
|---|---|---|---|
| 3,431,559 | 3/1969 | Webb | 375/116 |
| 3,566,280 | 2/1971 | Emmons et al. | 375/113 |
| 3,978,407 | 8/1976 | Forney, Jr. et al. | 333/18 |
| 3,991,379 | 11/1976 | Chadwick et al. | 375/113 |
| 4,001,693 | 1/1977 | Stackhouse et al. | 375/116 |
| 4,044,307 | 8/1977 | Borysiewicz et al. | 333/18 |
| 4,088,833 | 5/1978 | Godard et al. | 178/88 |
| 4,343,041 | 8/1982 | Forney, Jr. | 375/14 |

*Primary Examiner*—Robert L. Griffin
*Assistant Examiner*—Stephen Chin

[57] ABSTRACT

In modem apparatus having receiver circuitry which demodulates a received carrier into a sequence of received signals and decodes each signal into a signal point drawn from a predetermined signal point alphabet, the received carrier being modulated in accordance with a sequence of signal points representing a message, that improvement having circuitry for estimating the receipt of the end of the message by testing each received signal against a predetermined end-of-message condition.

7 Claims, 13 Drawing Figures

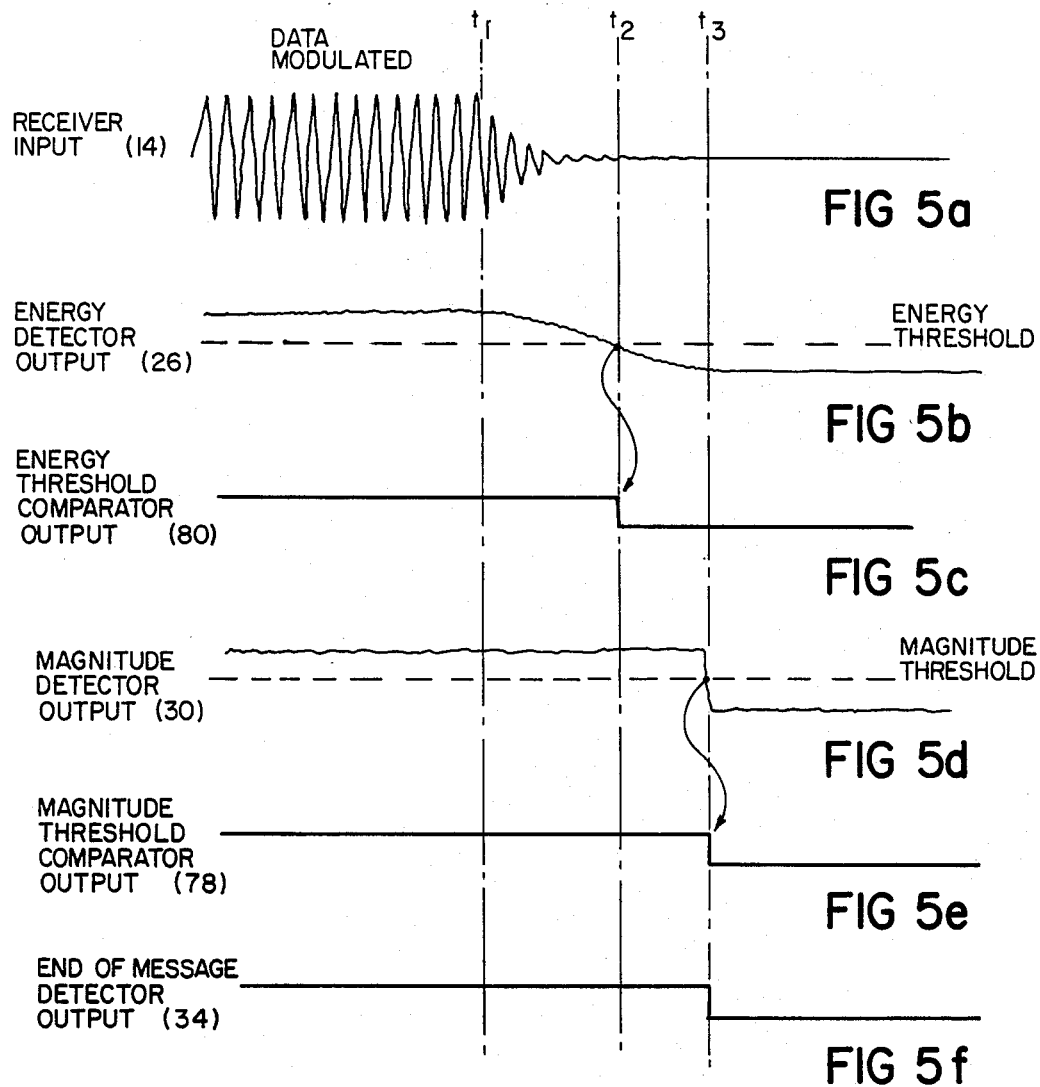
FIG 5a
FIG 5b
FIG 5c
FIG 5d
FIG 5e
FIG 5f
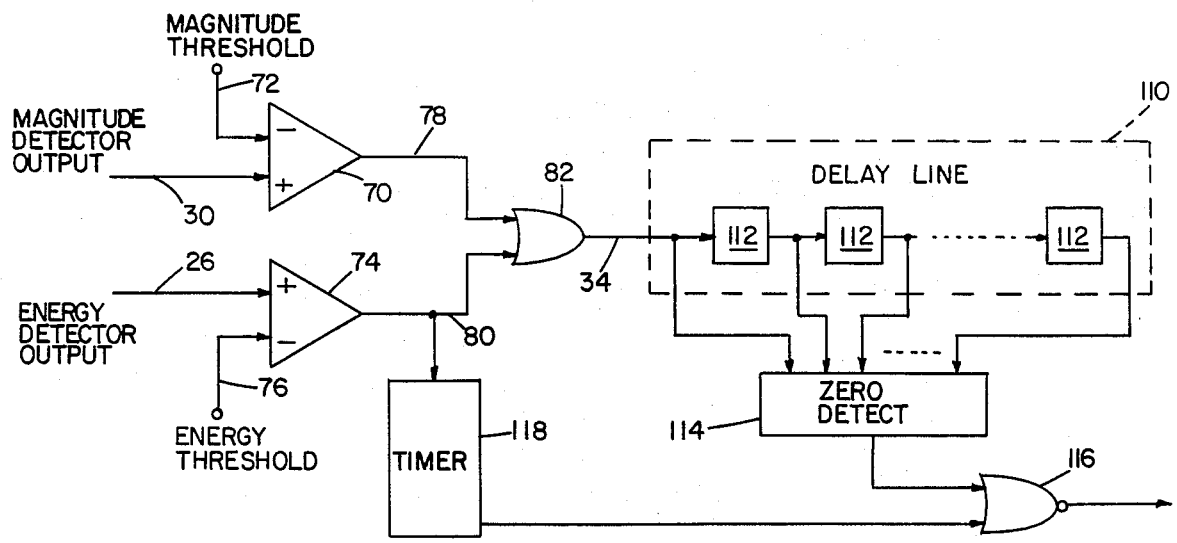
FIG 8

MODEM END OF MESSAGE DETECTOR

BACKGROUND OF THE INVENTION

This invention relates to modem apparatus for estimating when the end of a transmitted message has been received.

In modulated carrier communication systems, each message is typically transmitted by modulating a carrier in accordance with an alphabet of discrete signal points (e.g., signal points which specify the amplitude and phase of the carrier) corresponding to the symbols in the message. In typical multipoint modem networks, i.e. those having a master modem receiver and a number of slave modem transmitters, the master modem polls the slaves successively to receive messages (each message usually being brief). Efficient operation requires the master to spend the minimum possible overhead time (in excess of the duration of the message itself) in communication with a given slave.

Masters therefore typically include detectors for determining when the end of a received message has occurred so that the master can promptly proceed to poll other slaves. Such detectors ordinarily sense the energy level of samples of the received modulated carrier (before equalization or demodulation) and signal the end-of-message when either the carrier energy level falls below a predetermined percentage of the past average carrier level, or the average carrier energy level (taken over a period longer than the baud interval) falls below a predetermined threshold.

Because transmission channel interference usually causes the modulated carrier to acquire a "tail" following each message (i.e., a period after the last message symbol during which the amplitude of the carrier slowly trails off, rather than dropping sharply, to zero), it is difficult to determine precisely when a message has ended. To avoid chopping off the end of the message, some detectors delay for a predetermined period after the carrier energy level has dropped below the threshold before signaling the end of message. In such detectors, a portion of a message may be chopped off if the predetermined delay is too short in a given case. To avoid such chopping, the predetermined delay is typically selected conservatively long, which often wastes time.

SUMMARY OF THE INVENTION

In general, the invention features in modem apparatus having receiver circuitry which demodulates a received carrier into a sequence of received signals and decodes each signal into a signal point drawn from a predetermined signal point alphabet, the received carrier being modulated in accordance with a sequence of signal points representing a message, that improvement having circuitry for estimating the receipt of the end of the message by testing each received signal against a predetermined end-of-message condition.

In preferred embodiments, there is a magnitude detector for providing a value corresponding to the amplitude of each received signal, and the end-of-message condition is a predetermined amplitude threshold; the circuitry also has an energy detector for detecting an average energy level of the received carrier, prior to demodulation, and the circuitry tests the average energy level against a predetermined further condition (preferably a predetermined energy threshold); the circuitry also has an end-of-message signal generator responsive to the energy and magnitude detectors and connected to deliver an end-of-message signal when the end-of-message condition and the further condition have been met; the end-of-message signal generator is connected to provide the end-of-message signal either when the end-of-message condition and further condition have simultaneously been met for a predetermined proportion of the prior received signals in the sequence, or a predetermined delay period after the further condition has been met; and the signal point alphabet includes a non-data signal point (preferably the origin on the complex signal plane) for indicating the end of the message, and the end-of-message condition is the received signal being within a predetermined distance of the non-data signal point.

The magnitude detector accurately determines when to signal the end-of-message, not on the basis of a predetermined time delay after the carrier has trailed off to a level below a threshold, but on the detected time when the equalized, demodulated signal point is close to the origin. Chopping off the message, and wasting of time after the message ends are both minimized, improving communications efficiency. The effect of spurious noise is reduced by making the end of message signal depend on both the average carrier energy level, and the distance of the equalized, demodulated signal points from the origin.

Other advantages and features of the invention will become apparent from the following description of the preferred embodiments and from the claims.

DESCRIPTION OF THE PREFERRED EMBODIMENTS

We first briefly describe the drawings.

DRAWINGS

FIGS. 5a–5f are timing diagrams for the end of message detector.

FIGS. 7 and 8 are alternative embodiments of a portion of the end-of-message detector.

STRUCTURE

Figure 1:
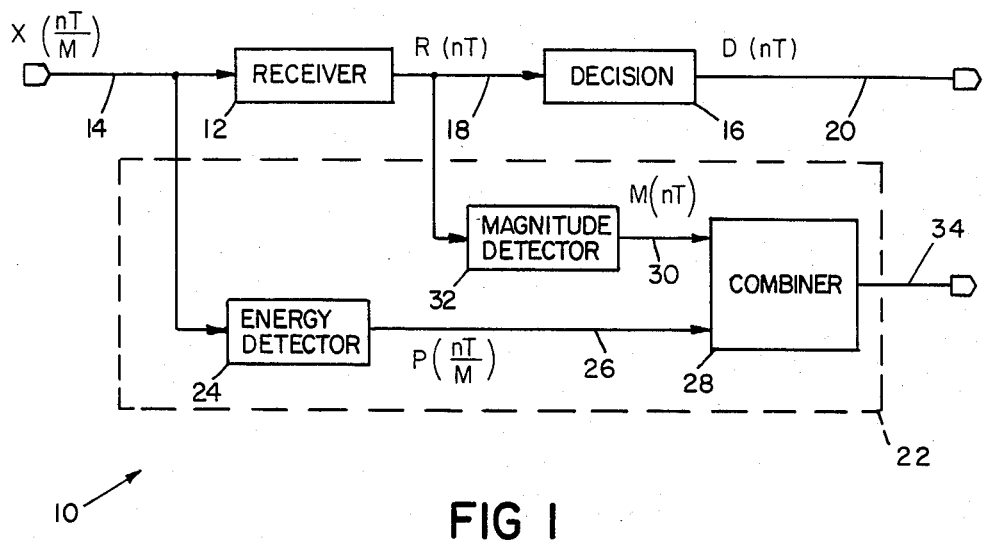
FIG. 1 is a block diagram of modem receiver apparatus including an end-of-message detector in accordance with the preferred embodiments.

Referring to FIG. 1, in QAM modem apparatus 10, receiver 12 (containing conventional filters, adaptive equalizer and demodulator) is connected to input line 14, which delivers fractionally spaced samples x(nT/m) of the received modulated carrier (which may or may not have been gain adjusted or digitized) at a sample rate T/m, where T is the baud (symbol) rate. The output of receiver 12 is connected to decision element 16, by line 18, which carries equalized, demodulated signals R(nT) at the baud rate T. The output of decision element 16 is connected to line 20, which carries the derived transmitted data stream D(nT) for further processing. The structure of one such modem receiver and decision element is disclosed in Forney, U.S. Pat. No. 4,343,041, incorporated herein by reference.

End of message detector 22 contains an energy detector 24 for estimating the average energy level of the modulated carrier samples x(nT/m). Energy detector 24 has its input connected to line 14 and its output to line 26, which carries a succession of values P(nT/m) at a rate T/m, which are estimates of the average energy of the carrier samples x(nT/m).

Line 26 connects to one input of combiner (end-of-message signal generator) 28, the other input of which is connected by line 30 to the output of magnitude detector 32. Magnitude detector 32 has its input connected to line 18. Line 30 carries a succession of values M(nT), at the baud rate T, each representing the distance of the received signal R(nT) from the origin of the complex signal plane.

Combiner 28 has its output connected to line 34, which carries the end of message signal, for use in controlling modem operation.

Figure 2:
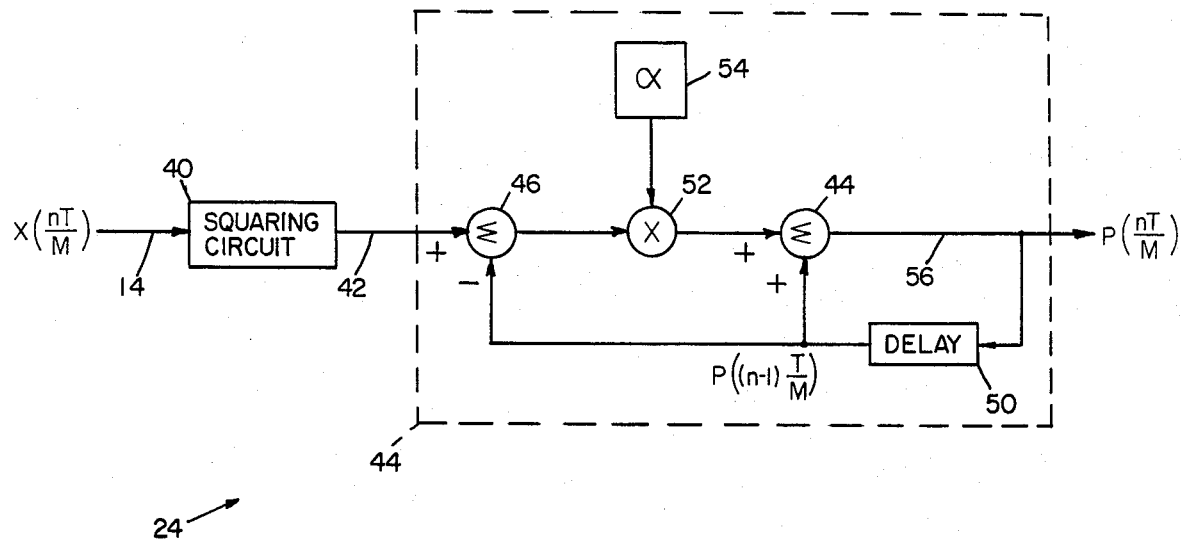
FIG. 2 is a block diagram of the energy detector portion of the end-of-message detector.

Referring to FIG. 2, in energy detector 24, line 14 is connected to the input of squaring circuit 40, which has its output connected to line 42. Line 42 carries the squared value of each sample x(nT/m) to the input of conventional single pole filter 44 (having a time constant $1/\alpha$, where $\alpha$ is selected to make the time constant smaller than the receiver delay nT) containing summers 46, 48, delay 50, multiplier 52, and memory element 54, all connected as shown. Line 56 carries the output values P(nT/m) of filter 44. Each output value is determined, in a known manner, in accordance with the equation $$P\left(n\frac{T}{m}\right) = P\left((n-1)\frac{T}{m}\right) + \alpha\left[x^2\left(n\frac{T}{m}\right) - P\left((n-1)\frac{T}{m}\right)\right]$$

Therefore, each value is an exponential average of the past signal samples x(nT/m) expressed as $$P\left(n\frac{T}{m}\right) = \alpha \sum_{i=0}^{\infty} (1-\alpha)^i x^2\left((n-1)\frac{T}{m}\right)$$

That is, $$P\left(n\frac{T}{m}\right) = E\left[x^2\left((n-1)\frac{T}{m}\right)\right]$$

P(nT/m) therefore reflects the average energy of the signal samples, while the message is being sent. When the message ends, the sample energy $x^2((n-1)T/m)$ will decay to zero and P(nT/m) will follow that decay with an exponential characteristic.

Figure 3:
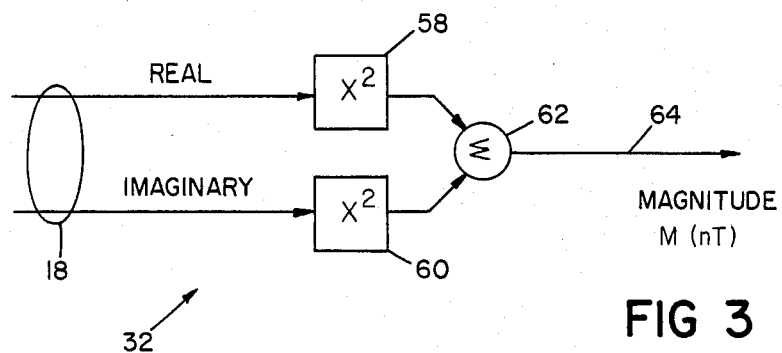
FIG. 3, is a block diagram of the magnitude detector portion of the end-of-message detector.

Referring to FIG. 3, in magnitude detector 32, the real and imaginary portions of samples R(nT) serve as inputs to respective squaring elements 58, 60. The outputs of squaring elements 58, 60 are connected to summer 62, whose output 64 carries values M(nT), where $$M(nT) = Re^2R(nT) + Im^2R(nT)$$

Figure 4:
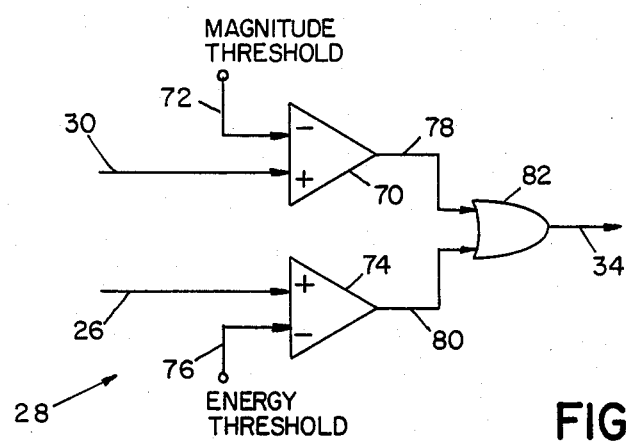
FIG. 4, is a block diagram of the combiner portion of the end-of-message detector.

Referring to FIG. 4, in combiner 28, comparator 70 has one input connected by line 30 to the output of magnitude detector 32. The other input of comparator 70 is connected to receive, over line 72, a value corresponding to a predetermined stored magnitude threshold. Comparator 74 has one input connected by line 26 to the output of energy detector 24. The other input of comparator 74 is connected to receive over line 76 a value corresponding to a predetermined stored energy threshold. The outputs of comparators 70, 74 are connected by lines 78, 80 to logical OR gate 82 whose output is connected to line 34, which carries the end of message signal.

The block diagrams of FIGS. 1-4 are implemented in the form of a programmable digital signal processor programmed conventionally in accordance with the equations and logic described above.

OPERATION

Referring to FIG. 5(a), at time $t_1$, when the actual end of message occurs, (i.e., the transmitted carrier is no longer modulated by data), the carrier energy level begins to trail off to zero.

Referring to FIG. 5(b), energy detector 24 determines the average energy of the carrier samples x(nT/m) and delivers a succession of values P(nT/m) indicative of the average energy. In a QAM modulation system having an alphabet of four discrete signal points all located at the same distance from the origin of the complex signal plane (see FIG. 6), the average energy of x(nT/m) will remain approximately constant while the carrier is being modulated by data signal points and will trail off to zero after the last signal point of a message is sent. Thus, the output of energy detector 24 will be a relatively constant positive value during the message and will trail off to zero beginning at the end of message.

Referring to FIG. 5(c), when the level of the output of energy detector 24 falls below the predetermined stored threshold at time $t_2$ (indicating that the carrier energy level has fallen to a point that the end of message may have occurred), the logical output of energy threshold comparator falls from high to low.

Figure 6:
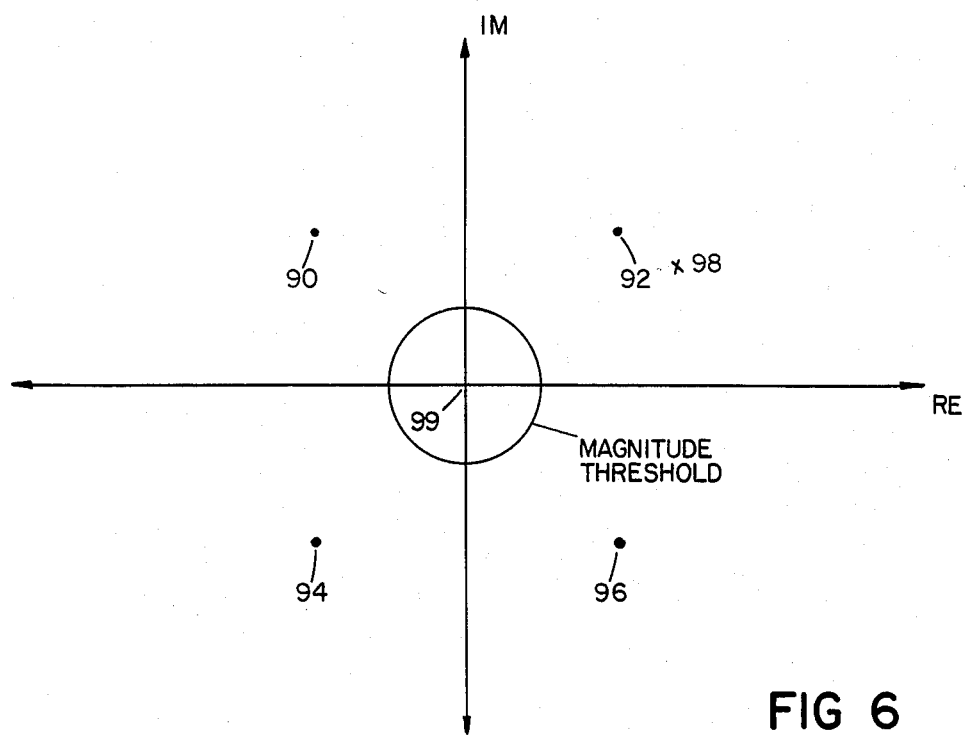
FIG. 6 is a signal point constellation.

Referring to FIG. 6, the message is transmitted by modulating the carrier based on a succession of the four signal points 90, 92, 94, 96 corresponding to data which make up the message. The output of receiver 12 is a succession of values which are close to, but because of noise and residual intersymbol interference typically not identical with, one of the signal points 90, 92, 94, 96. For example, if signal point 92 were sent at a particular time, the output of receiver 12 might be at point 98, close to point 92, but relatively far from the origin. The transmitter indicates the end of message by ceasing to modulate the carrier in accordance with one of the signal points 90, 92, 94, 96, and instead in effect "modulating" it with the non-data signal point 99, i.e., the origin. Thus the origin is an implicit end-of-message signal point.

Referring to FIG. 5(d) magnitude detector 32 determines an amplitude value corresponding to the distance from the origin of each signal R(nT) delivered by the receiver over line 18. As long as each receiver output signal point is close to one of the data signal points 90, 92, 94, 96, and far from the origin, the output of magnitude detector 32 remains high. But when the receiver output signal point falls close to the origin (as it will after the transmitter "sends" the origin as the end-of-message signal point and that point has passed through the receiver equalizer (i.e., nT intersymbol intervals later)) then the magnitude detector output will fall quickly to zero.

Referring to FIG. 5(e), as the magnitude detector output falls below the predetermined stored magnitude (i.e., amplitude) threshold at time $t_3$, the previously high logical output of the magnitude threshold comparator falls to a low logical state, indicating that the received signal point is the origin, i.e., that the message has ended.

Referring to FIG. 5(f), combiner 28 logically combines the outputs of the energy and magnitude threshold comparator outputs to provide the end of message signals. While the message is being sent (i.e., before time $t_1$ in FIG. 5), both the average energy of $x(nT/m)$ and the magnitude of $R(nT)$ exceed their respective thresholds. The energy detector output will cross its threshold at time $t_2$, sometime after the message has ended. During the passage of the receiver imposed delay period of nT between the end-of-message and the time ($t_2$ on FIG. 5) when the last message signal is delivered by the receiver, the magnitude detector output remains high. The magnitude detector will only fall low when the end-of-message signal (i.e., a signal sufficiently close to the origin) has passed through the receiver. The end-of-message detector output will then fall low, giving an accurate and prompt indication of the end of a message.

The system is insensitive to spurious noise (which might accidentally cause the receiver output to be zero, even though the end of message hasn't occurred) because the end-of-message signal will not be issued unless the average energy level of the carrier is also below its energy threshold.

In effect, the end-of-message detector thus tests each signal against an end-of-message condition (i.e., the amplitude threshold), and tests the average energy at the modulated carrier against a further condition (i.e., the energy threshold), and signals end of message only when both conditions are met. The operation of the detector thus corresponds to the following state diagram:

| STATE OF CARRIER | Time Period (see FIG. 5) | Energy Threshold Comparator Output | Magnitude Threshold Comparator Output | End of Message Signal |
| --- | --- | --- | --- | --- |
| Modulated by data signal points | Up to $t_1$ | 1 | 1 | 1 |
| Modulated by data signal points in the presence of spurious noise | | 1 | 0 | 1 |
| Not modulated by data but zero signal has not passed through receiver | $t_1$ to $t_2$ | 0 | 1 | 1 |
| Not modulated by data and zero signal has passed through receiver | after $t_2$ | 0 | 0 | 0 |

OTHER EMBODIMENTS

Figure 7:
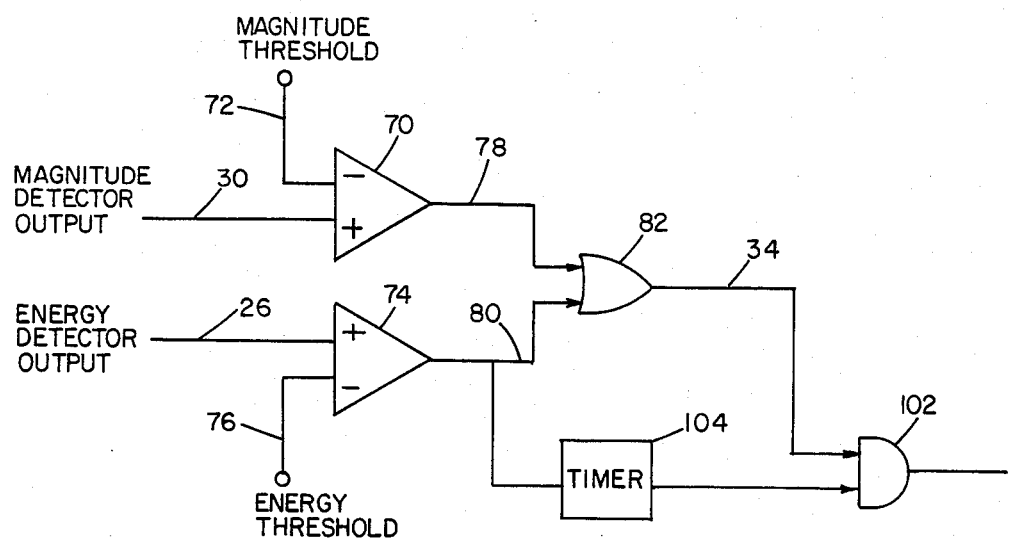

Referring to FIG. 7, in other embodiments, the output of logical OR gate 82 is connected to one input of a logical AND gate 102, the other input of which is connected via timer 104 to the output of energy threshold comparator 74. Timer 104 sends a low signal to gate 102 a predetermined time interval after the energy level falls below the energy threshold. Thus, the output of AND gate 116 will fall low (indicating end of message) when either or both the time output and the output of gate 82 are low, assuring an end-of-message signal within a predetermined time delay after the energy level falls below threshold, regardless of the instantaneous operation of the magnitude detector.

Referring to FIG. 8, in other embodiments the output of logical OR gate 82 is connected to an M-element delay line 110. The outputs of elements 112 of delay line 110 (and the output of logical OR 82) are all connected to a zero detect element 114, the output of which is connected to one input of logical NOR 116. The other input of logical NOR 116 is connected to the output of timer 118, whose input is connected to the output of energy threshold comparator 74. The output of zero detect 114 goes high when the output of the logical OR 82 has been low for N of the last M (where N is less than or equal to M) baud intervals. The timer 118 sends a high signal to gate 116 a predetermined time interval after the energy level falls below threshold (as indicated by a low output from comparator 74). The time delay is related to the time constant ($1/\alpha$), the delay through the receiver, and the value of M. This circuit assures that an end-of-message signal will be issued (i.e., the output of gate 116 will go low) when the average carrier energy is low for a period of many bauds, even though spurious noise or improper equalization prevents proper operation of the magnitude detector.

Other embodiments are within the invention. E.g., the non-data signal point for indicating the end-of-message could be other than the origin.

I claim:

1. In modem apparatus having receiver circuitry which demodulates a received carrier into a sequence of received signals and decodes each said signal into a signal point drawn from a predetermined signal point alphabet, said received carrier being modulated in accordance with a sequence of said signal points representing a message, that improvement comprising circuitry for estimating the receipt of the end of said message by testing each said received signal against a predetermined end-of-message condition and wherein said signal point alphabet includes a non-data signal point for indicating the end of said message, and said end-of-message condition comprises said received signal being within a predetermined distance of said non-data signal point.

2. The modem apparatus of claim 1 wherein said circuitry comprises a magnitude detector for providing a value corresponding to the amplitude of each said received signal, and wherein said end-of-message condition is a predetermined amplitude threshold.

3. The modem apparatus of claim 2 wherein said circuitry further comprises an energy detector for detecting an average energy level of said received carrier, prior to demodulation, and wherein said circuitry tests said average energy level against a predetermined further condition.

4. The modem apparatus of claim 3 wherein said further condition is a predetermined energy threshold.

5. The modem apparatus of claim 3 wherein said circuitry further comprises an end-of-message signal generator responsive to said energy and magnitude detectors and connected to deliver an end-of-message signal when said end-of-message condition and said further condition have been met.

6. The modem apparatus of claim 5 wherein said end-of-message signal generator is connected to provide said end-of-message signal either when said end-of-message condition and further condition have simultaneously been met for a predetermined proportion of the prior received signals in said sequence, or a predetermined delay period after said further condition has been met.

7. The modem apparatus of claim 1 wherein said non-data signal point is the origin on the complex signal plane.

* * * * *